May 7, 1929.　　　G. A. JESSOP　　　1,711,891

DRAFT TUBE

Filed March 11, 1925　　3 Sheets-Sheet 1

Inventor
George A. Jessop
By
Attorney

Inventor
George A. Jessop
By
Attorney

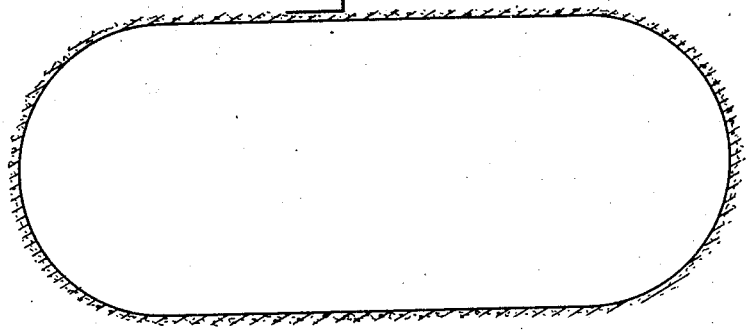
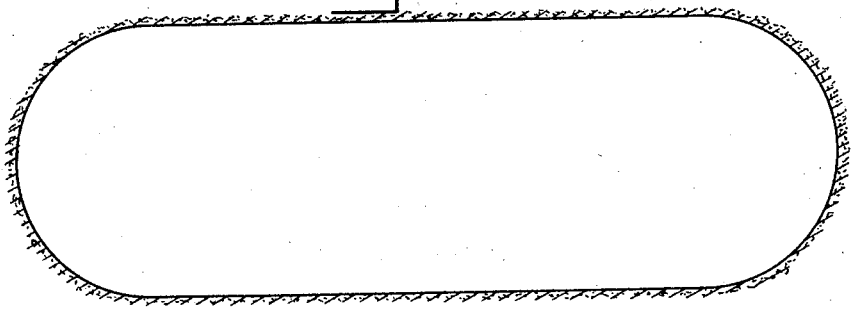
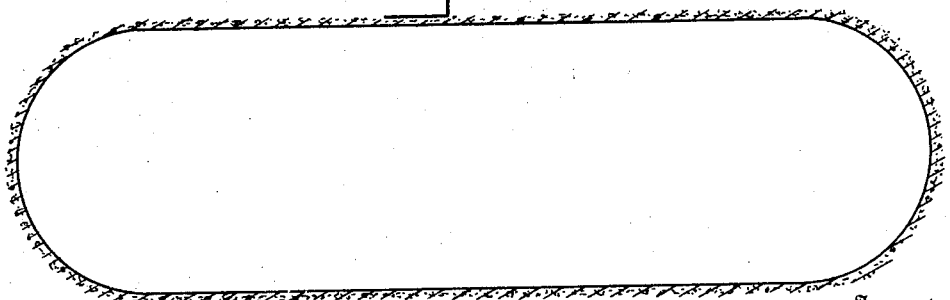

Patented May 7, 1929.

1,711,891

UNITED STATES PATENT OFFICE.

GEORGE A. JESSOP, OF YORK, PENNSYLVANIA, ASSIGNOR TO S. MORGAN SMITH COMPANY, OF YORK, PENNSYLVANIA, A CORPORATION OF PENNSYLVANIA.

DRAFT TUBE.

Application filed March 11, 1925. Serial No. 14,850.

This invention relates to draft tubes and particularly to the elbow type formed of concrete or other analogous material, or metal.

Draft tube structures at present involve many important features that require careful consideration and analysis to meet and satisfy contingencies and demands of various installations in order to maintain the greatest efficiency possible in the operation of turbines and other analogous water power mechanisms, not only in primary placements but also in repair or replacement work. For various well known reasons, the runner or water wheel of a turbine or analogous power installation is practically always set at some distance above normal tail water elevation, and it is necessary to have a draft tube in order to make use of the head between the wheel and tail water. The velocity out of the runner is comparatively high and therefore the energy of the water at this point is considerable. In general the function of any draft tube is to make use of the static head between the runner or water wheel and the tail race and also to regain the velocity head at the discharge end of the runner by gradually, smoothly and efficiently converting this large velocity head into pressure head, so that it can become effective upon the runner or wheel itself. The effect of this change from velocity head to pressure head is to decrease the back pressure under the runner or wheel. The conversion of velocity head into pressure head must be done as efficiently as possible, and in order to accomplish this desirable result, it is necessary that the rapidly moving water in the draft tube remain in full flowing contact with the surfaces of the tube at all points. In an elbow draft tube it is very difficult to keep the water in full flowing contact with the downstream or upper face of the tube where the turn is made from the vertical to the horizontal, and if this contact of the water with all surfaces of the draft tube is not maintained, there will be a turbulency or eddy at the elbow, particularly adjacent the downstream or upper face of the tube, with material disadvantage in the effective operation of the tube.

The primary and most essential object of the present invention, therefore, is to so construct a draft tube that the water will be maintained in full flowing contact with all surfaces of the draft tube and particularly the downstream or upper face of the tube where the turn or elbow is formed without in the least detracting from the desirable efficiency of operation. This water contact with all surfaces of the tube is accomplished through the medium of structural features which will be hereinafter specified.

Further objects of the invention are: to generally improve draft tube structures and obtain an efficient device of this class without requiring an undue amount of excavation either in depth or width; to so construct a draft tube that, if desired, the center line of the runner or wheel can be placed close to tail water and thus decrease the required height of the power house or other superstructure thereover; to form a tube of such over-all dimensions that in a power house having two or more installed units, the distance from center to center of the units can be materially minimized, and thus reduce the lengthwise construction of the power house and consequently decrease the cost of installation; to so shape a draft tube that the expense for form work for molding in concrete is materially reduced, or, if the improved draft tube be made of metal or sheet steel, the shape will be simplified as much as possible and thereby minimize the expenditure of time and cost in the lay-out and construction thereof.

The invention consists essentially in providing a draft tube having an elbow the upstream and downstream surfaces of which are so curved as to maintain the water in full contact therewith, and also in providing such a draft tube which is gradually decreased in transverse vertical extent or breadth from a predetermined point above and fully through the turn or elbow, and increased in lateral or horizontal extent, and gradually widened towards the outlet extremity, a gradual increase in cross-sectional area from the upper inlet to the lower outlet extremity being regularly maintained. The invention further consists in the general construction and arrangement of parts which will be more fully hereinafter described and claimed.

The accompanying drawings illustrate the improved draft tube formed of concrete or analogous cementitious material, but it will be understood that the same essential features of the invention may be included in a metal or sheet steel draft tube.

In the drawings:

Fig. 7 is a transverse section on the line 7—7, Fig. 1.

Fig. 8 is a transverse section on the line 8—8, Fig. 1.

Fig. 9 is a vertical section on the line 9—9, Fig. 1.

Figure 1:
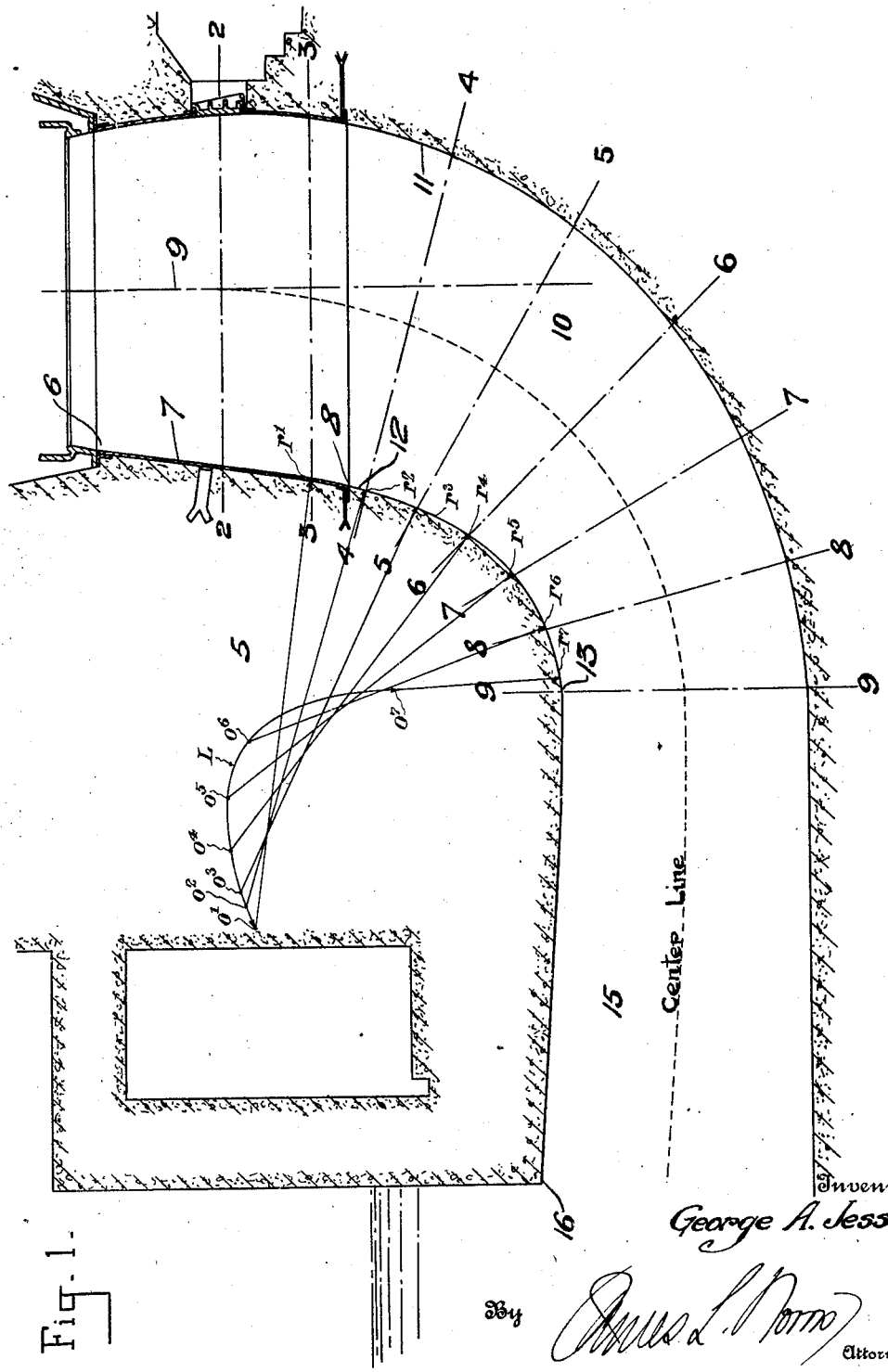
Fig. 1 is a transverse vertical section through a draft tube embodying the features of the invention.
Figure 2:
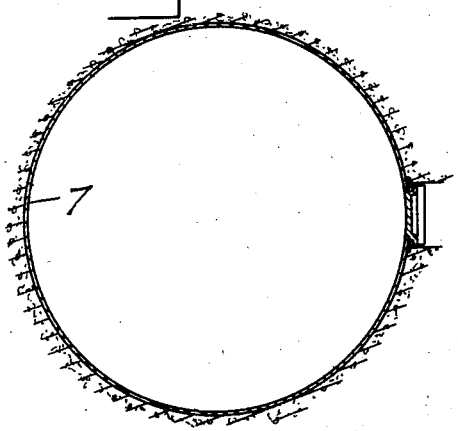
Fig. 2 is a horizontal section on the line 2—2, Fig. 1.
Figure 3:
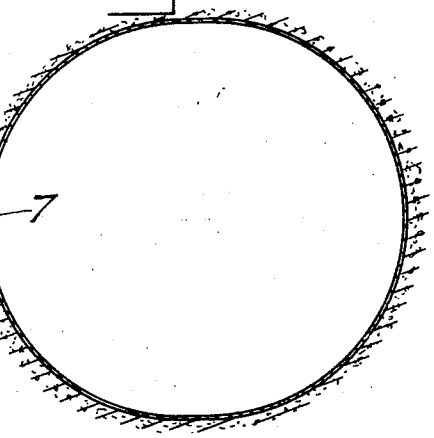
Fig. 3 is a horizontal section on the line 3—3, Fig. 1.
Figure 4:
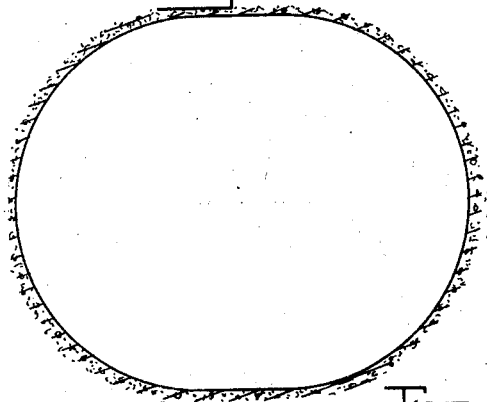
Fig. 4 is a transverse section on the line 4—4, Fig. 1.
Figure 5:
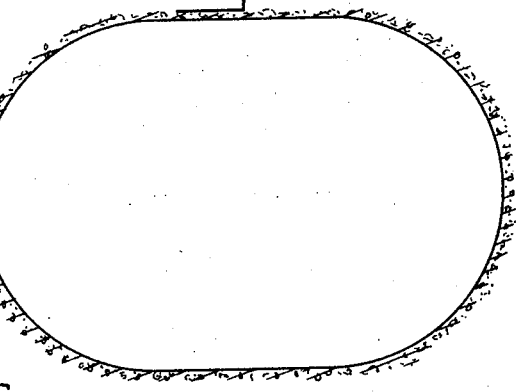
Fig. 5 is a transverse section on the line 5—5, Fig. 1.
Figure 6:
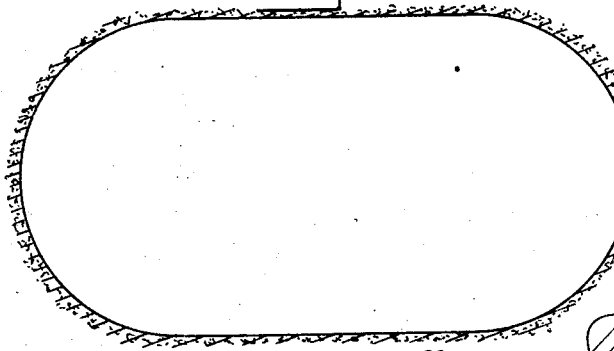
Fig. 6 is a transverse section on the line 6—6, Fig. 1.

The numeral 5 designates a concrete or other cementitious structure in which the improved draft tube is suitably formed, the latter comprising an upper inlet extremity 6 over which the runner or wheel is adapted to be mounted in the usual manner. The concrete or other analogous structure 5 may be continued upwardly any suitable distance to serve as a base support for the installation of the remaining part of a turbine or other water power organization, and also for the purpose of supporting a power house in which the turbine unit or units are disposed. The upper member 7 of the improved draft tube is shown as composed of sheet or other metal down to the point 8, the remaining part of the draft tube being shaped in the concrete or other material 5. It will be understood, however, that the upper member 7 of the draft tube, which may be specified as the "inlet member," may in some instances be constructed or shaped in the concrete. This upper inlet member 7 to a point a short distance below the plane of section 2—2 is concentric with relation to an axial line 9, which is also the axis of the runner or wheel and the turbine shaft above. The upper inlet member 7 is also slightly bowled and regularly flares in a downward direction. At a comparatively short distance below the plane of section 2—2 and as indicated by the plane of section 3—3, Fig. 3, the draft tube begins to assume an elliptical contour, and this configuration increases gradually through the elbow 10, as indicated by Figs. 4 to 9, inclusive, respectively taken on the planes or lines of section 4—4, 5—5, 6—6, 7—7, 8—8 and 9—9. In order to arrive at this construction, the curve 11 of the upstream or lower side of the elbow 10 is begun prior to the curve 12 of the downstream or forward upper wall of the draft tube elbow. The rear or upstream curve 11 comes from the vertical to the horizontal in an arc with a practically constant radius, or, in other words, with a constant curvature. The curvature 12 of the downstream or upper face of the elbow starts at a materially lower elevation than the said upstream curve 11 when considering a vertical tube construction only. In other words, the curvature 12 of the downstream face of the elbow in the downstream direction starts much later than the curvature 11 of the upstream face. This downstream curve 12 of the upper face is an easement curve, that is, at the beginning thereof there is a long radius of curvature and this radius is gradually decreased and becomes a minimum at or near the end of the curve, as at 13, and which in a vertical setting is at the horizontal. The diagram in Figure 1 shows the preferred manner of forming the easement curve, $o^1$—$r^1$, $o^2$—$r^2$, $o^3$—$r^3$, $o^4$—$r^4$, $o^5$—$r^5$, $o^6$—$r^6$, and $o^7$—$r^7$ representing the radii of the easement curve at the cross sections represented by the section lines 3—3, 4—4, 5—5, 6—6, 7—7, 8—8 and 9—9, and L representing the locus of the centers of the various radii. Taking the lengths of the radii as shown in this diagram, it will be seen that they decrease in length as they proceed from the section line 3—3 to the section line 9—9 and when the section line 9—9 is reached, the easement curve 12 has reached the horizontal and hence the curvature is stopped at this point. This easement curve which, for the purposes of illustration, begins at or about the part of the draft tube elbow cut by the section line 3—3 and terminates at the point 13, is valuable and necessary in order to allow and assist the water to remain in full flowing contact with the downstream or upper face of the elbow portion of the draft tube, and thereby assist in maintaining a practically constant velocity of water at a given section of the draft tube. The maintenance of a constant velocity at all points in a given section of a draft tube, said section being taken approximately at right angles to the longitudinal center line, is necessary in order to maintain smooth flow and therefore high efficiency in the tube. Again, for the purpose of illustration, let it be assumed that the tube is divided into three distinct parts. The first part is the vertical section or inlet member 7 with a straight vertical center line immediately below the runner. The sections at this inlet part or member of the tube are true, or approximately true, circles, and for convenience of description, the words "breadth" and "width" will be applied to the different sections of the tube, the breadth being intended to mean the distance between the walls of the tube as cut by a plane passing through the longitudinal center line thereof, and by width is meant the distance between the walls of the tube as measured at right angles to the foregoing plane, each measurement passing through the longitudinal center line of the tube.

The second part of the tube is the curved or elbow section 10. The breadth of the tube is a maximum at the end of the first part, and at the beginning of the second part or section or elbow 10. The breadth of the first part or inlet member 7 relatively decreases from its maximum at the entrance of this second part or section to its minimum at or near the end of the bend or elbow as at 13. In other words, the upstream or lower face of the draft tube defined by the curve 11 approaches and gets nearer to the downstream or upper face of the draft tube defined by the curve 12. At the same time the width of the draft tube is increased all along the bend or elbow, and this increase is such that the area of the tube is constantly increasing, so that the velocity of the water in the tube is constantly decreasing, or the velocity head is constantly being converted into pressure head. The reduction in the breadth of the tube from the beginning of the upper end of the second section or part or elbow 10 is accomplished by making the curvature of the upstream and downstream faces of the tube, or the lower and upper sides of the tube, in the curvature forms hereinbefore specified and also because the curvature of the downstream or upper face or side is started at a considerably lower point or later than the curvature of the upstream face.

The third part or section of the tube is the horizontal leg 15. Both the breadth and width of this leg can increase gradually, and it is not necessary that both increase, in view of the fact that one, for instance the breadth or vertical extent of the leg, could remain consant and even be decreased, provided the width or lateral extend of the tube be increased a sufficient degree so as to maintain the constantly increasing area as the water approaches nearer and nearer the outlet 16. As hereinbefore indicated, from the entrance of the improved tube to the outlet thereof the area is constantly increasing and therefore the velocity of the water is constantly decreasing.

By the term "easement curve" as hereinbefore referred to, is to be understood the well known engineering definition and which is a curve usually introduced between a tangent and a circular curve, and is a curve of varying radius, which leaves the tangent as a very flat curve and grows sharper and sharper until it has the same radius as the circular curve, but in the present improved draft tube, instead of the curve terminating in a circular curve, it ends in nearly a straight tangent to the curve, as the bottom of the curve, or the end of the elbow, is reached.

The operation of the improved draft tube is very simple. The water entering the inlet member from the runner passes down into the bend or elbow which is reduced in breadth from the upstream towards the downstream portion thereof and increased in width or lateral extent, and upon reaching the elbow the water is guided forward or towards the downstream portion or side of the elbow bend and at the same time spreads laterally or in a horizontal direction and continues on through the outlet extremity of the leg and is finally discharged from the latter. The construction of the elbow bend as specified eliminates objectionable whirls or eddies and causes the draft tube throughout its length to be filled, full flowing, with the water discharged from the runner or wheel, and as the tube gradually increases in area from its inlet towards its outlet extremity, the flow of water through the tube is gradually decelerated towards the outlet end of the tube and finally discharged into the tail-race.

What is claimed as new is:

1. A draft tube having inlet and outlet extremities and an elbow bend between the extremities, said elbow bend at the upstream portion having a curve which comes from the vertical to the horizontal in an arc with a practically constant radius and the opposite or downstream portion having an easement curve beginning with a long radius or curvature which gradually decreases and becomes a minimum at or near the end of the curve, to decrease the breadth of the elbow bend in a direction from the upstream towards the downstream portion of the tube, the tube having an increase in width or lateral extent at the elbow which increase in width is at least equal, in proportion to the area, to said decrease in breadth.

2. An elbow draft tube comprising inlet and outlet extremities with an elbow bend between and continuous therewith, the inlet extremity being concentric with relation to a central axis and the rear or upstream portion of the tube formed by a curve that comes from the vertical to the horizontal in an arc with a practically constant radius, the downstream portion of the elbow bend being formed by a curve which starts at a materially lower elevation than the curve of the upstream portion and is in the form of an easement curve which starts with a long radius of curvature that gradually decreases and becomes a minimum at the end of the curve.

3. A draft tube having an inlet extremity concentric with relation to a central axis and continuing into an elbow which is gradually decreased in breadth from the upstream towards the downstream portion thereof by means of an upstream, practically constant radius curve and a downstream easement curve, the tube being laterally increased in width and terminating in an outlet extremity.

4. A draft tube having an inlet extremity concentric with relation to a central axis and continuing into an elbow which is gradually decreased in breadth from the upstream towards the downstream portion thereof by means of an upstream, practically constant radius curve and a downstream easement curve and proportionately laterally increased in width and terminating in an outlet leg, the draft tube from its inlet to its outlet extremity increasing in area.

5. A draft tube comprising an inlet member and an outlet leg with an elbow bend therebetween, the said elbow bend being decreased in breadth from the upstream towards the downstream portion thereof by means of an upstream, practically constant radius curve and a downstream easement curve, said easement curve starting at a materially lower elevation than said constant radius curve and said bend being correspondingly and proportionately increased in width.

6. A draft tube having inlet and outlet extremities with an elbow bend therebetween, the inlet extremity being circular and the tube as an entirety from its inlet to its outlet extremity being increased in lateral extent and continued with this lateral increase through the elbow bend in a direction from the upstream towards the downstream portion of said bend, the elbow bend having an upstream, practically constant radius curve and a downstream easement curve.

7. A draft tube having inlet and outlet extremities with an elbow bend therebetween and gradually increased in lateral extent from the inlet extremity, which is circular, to the outlet at a material distance beyond the termination of the elbow bend, the elbow bend correspondingly and gradually increasing in lateral extent throughout the formation thereof towards the outlet extremity, the elbow bend having an upstream, practically constant radius curve and a downstream easement curve.

8. A draft tube having inlet and outlet extremities with an elbow bend interposed between said extremities and continuous therewith, the said elbow bend being materially flattened in a transverse vertical direction within the area of the bend from the upstream towards the downstream portion thereof and also increased in width within the area of the bend towards and regularly continuing into the outlet extremity, the elbow bend having an upstream, practically constant radius curve and a downstream easement curve.

9. A draft tube having inlet and outlet extremities and an elbow bend between the two extremities, the inlet extremity being concentric with relation to a central axis and regularly continuing into the elbow bend, the elbow bend decidedly decreasing in breadth by an upstream, practically constant radius curve and a downstream easement curve, the bend also positively increasing in width divergently and this divergence regularly and fully continuing to the outlet extremity of the tube.

10. A draft tube having an inlet extremity concentric with relation to a central axis and continuing into an elbow which is gradually decreased in breadth from the upstream towards the downstream portion thereof by an upstream, practically constant radius curve and a downstream easement curve, the draft tube being increased in width and terminating in an outlet extremity having a flattened top portion.

11. A draft tube having an inlet extremity concentric with relation to a central axis and continuing into an elbow which is gradually decreased in breadth from the upstream towards the downstream portion thereof by means of an upstream, practically constant radius curve and a downstream easement curve and proportionately laterally increased in width and terminating in an outlet leg, the said outlet leg having a flattened top portion and opposite vertical sides, the draft tube from its inlet to its outlet extremity increasing in area.

12. A draft tube having inlet and outlet extremities with an elbow therebetween, the elbow bend having an upstream substantially constant radius curve and a downstream easement curve.

13. An elbow draft tube having an inlet extremity concentric with relation to a central axis and wherein also the elbow bend has an upstream substantially constant radius curve and a downstream easement curve.

14. A draft tube having a circular inlet, an elbow bend contracted in breadth and expanded in width and continuous with the said inlet and operating to cause a round column of water entering the draft tube ahead of the elbow bend to be flattened in breadth and expanded in width, the elbow bend having an upstream substantially constant radius curve and a downstream easement curve.

15. A draft tube having an inlet extremity concentric with relation to a central axis and continuing into an elbow which is gradually decreased in breadth from the upstream towards the downstream portion thereof by an upstream, practically constant radius curve and a downstream easement curve, the draft tube being increased in width and terminating in an outlet extremity having a flat upwardly flaring top portion.

16. A draft tube having an inlet extremity concentric to a central axis and continuing into an elbow which is gradually decreased in breadth from the upstream towards the downstream portion thereof by means of an upstream, practically constant radius curve and a downstream easement curve and proportionately laterally increased in width and terminating in an outlet leg, the said outlet leg having a flattened top portion with an upward flare and opposite vertical sides, the draft tube from its inlet to its outlet extremity increasing in area as a whole.

17. A draft tube comprising an inlet member and an outlet leg with an elbow therebetween, the said elbow being decreased in breadth from the upstream towards the downstream portion thereof by means of an upstream, practically constant radius curve and a downstream easement curve, said easement curve starting at a materially lower elevation than said constant radius curve, and the said elbow bend being correspondingly and proportionately increased in width, the outlet leg having a flattened top portion with an upward flare, the top portion being straight in a transverse direction.

18. A draft tube having inlet and outlet extremities with an elbow bend therebetween and gradually increased in lateral extent from the inlet extremity which is circular in contour to the outlet leg at a distance beyond the termination of the elbow bend, the elbow bend correspondingly and gradually increasing in lateral extent throughout the formation thereof towards the outlet extremity, the elbow bend having an upstream, practically constant radius curve and a downstream easement curve, the elbow also gradually decreasing in vertical extent towards the outlet extremity, and the outlet extremity having a flattened top which is transversely straight from side to side, and continues with diminishing structure partially into the downstream side of the elbow and also flares upwardly towards the terminal of the outlet extremity from the elbow.

19. A draft tube having inlet and outlet extremities and an elbow bend between the said extremities, said elbow bend at the upstream portion having a curve which comes from the vertical to the horizontal in an arc of a circle and the opposite or downstream portion having an easement curve which is formed in the center with a dip towards and merging into the top of the outlet extremity and providing an easement curve with less rapid change of curvature at its terminal and which merges into the outlet extremity which has a transversely straight flattened top, the outlet extremity being proportionately increased in width with relation to the remaining part of the tube and the outlet extremity having a gradual upward flare from the elbow bend to the end of said outlet extremity.

20. A draft tube having an inlet extremity concentric with relation to a central axis and continuing into an elbow which is gradually decreased in breadth from the upstream towards the downstream portion thereof by an upstream practically constant radius curve and a downstream easement curve, the draft tube being increased in width and terminating in an outlet extremity having a flattened bottom portion.

21. A draft tube having an inlet extremity substantially concentric with a central axis and continuing into an elbow which gradually decreases in breadth from the upstream towards the downstream portion thereof by means of an upstream practically constant radius curve and a downstream easement curve, the tube being laterally increased in width and terminating in an outlet extremity having flattened top and bottom portions.

In testimony whereof I have hereunto set my hand.

GEORGE A. JESSOP.